June 6, 1950     M. W. MARSHALL ET AL     2,510,123

CLADDING APPARATUS

Filed Nov. 10, 1948     4 Sheets-Sheet 1

INVENTORS.
Marcus W. Marshall
Ward B. Browning, Jr.

Allen & Allen
ATTORNEYS.

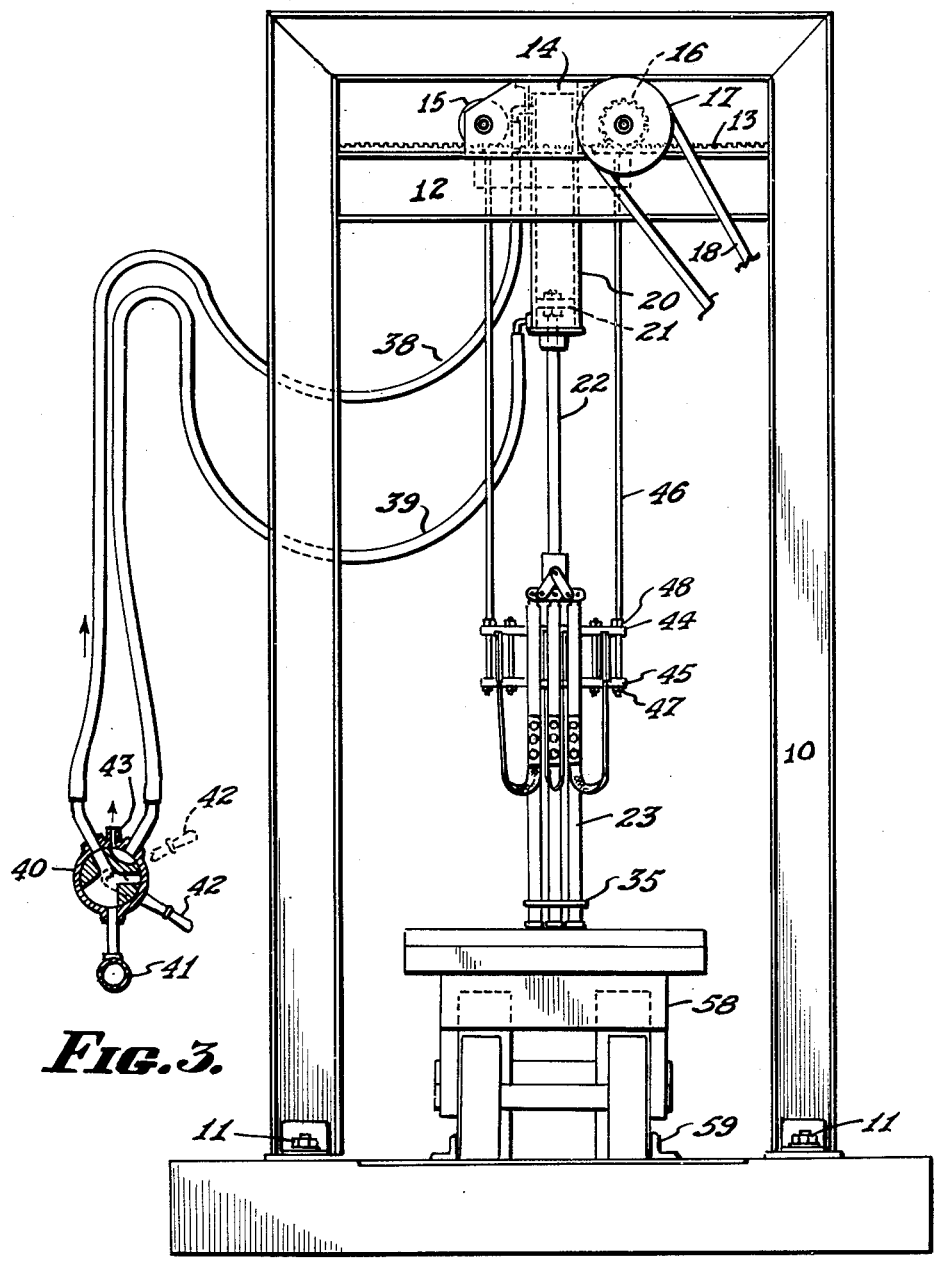
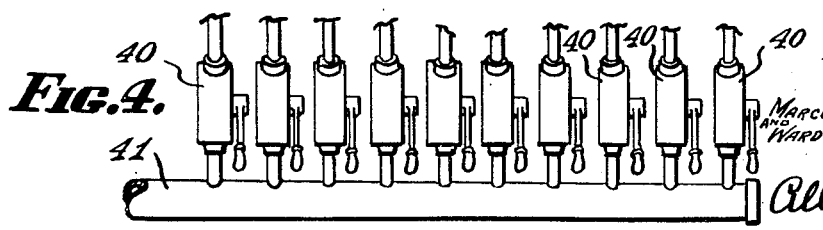

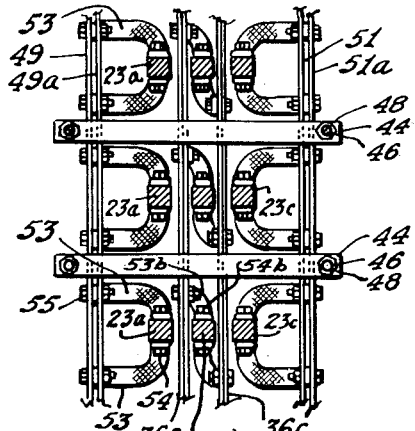
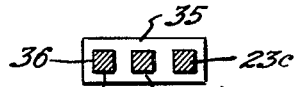
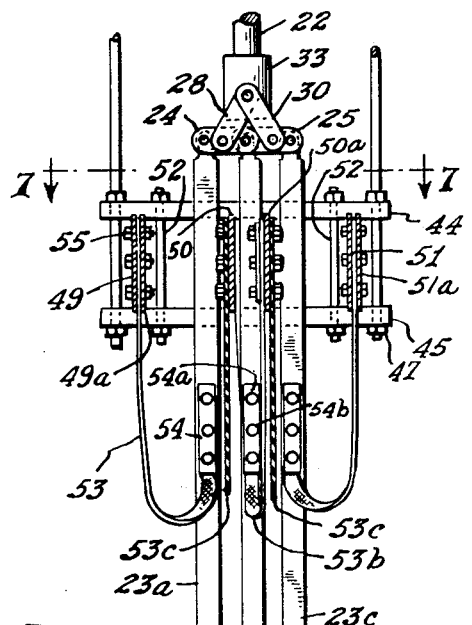
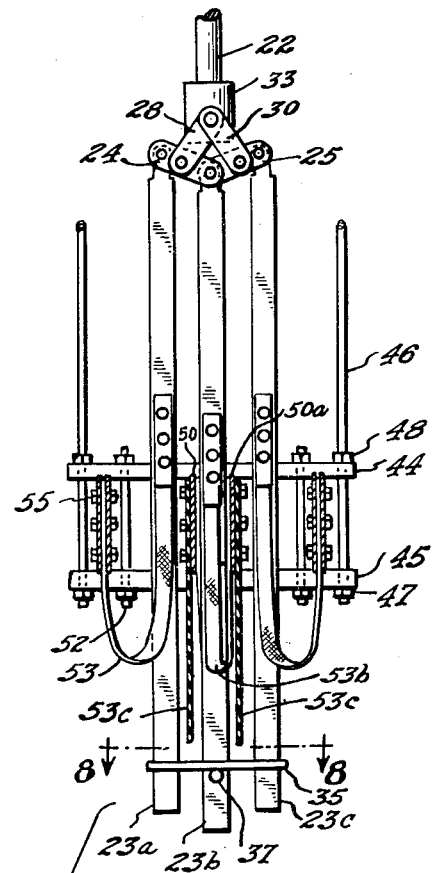

June 6, 1950  M. W. MARSHALL ET AL  2,510,123
CLADDING APPARATUS
Filed Nov. 10, 1948  4 Sheets-Sheet 4
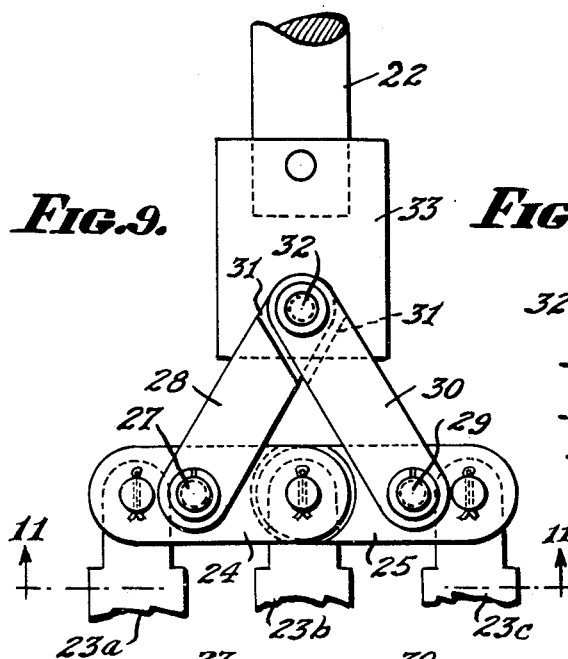
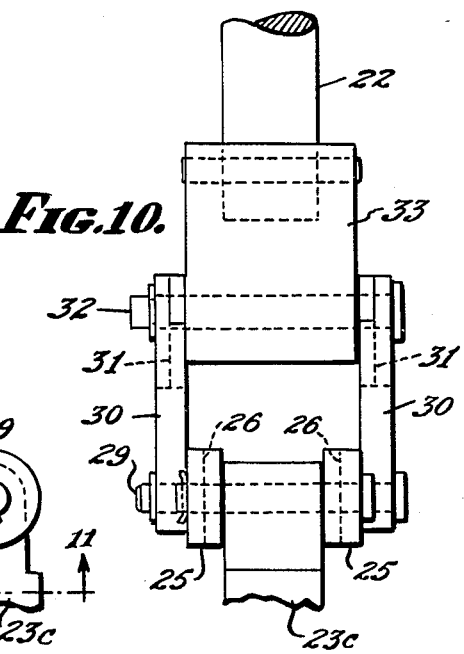
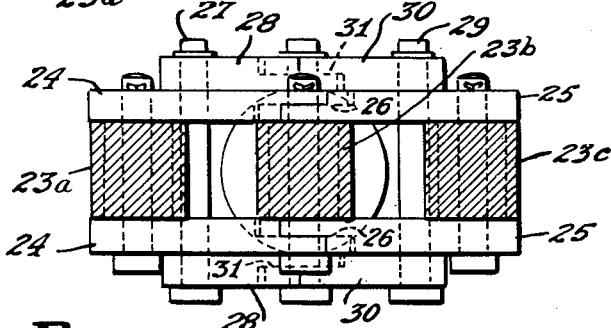
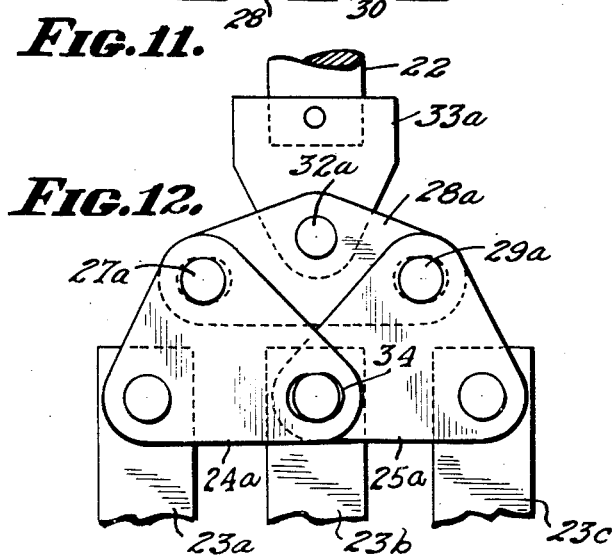
INVENTORS.
MARCUS W. MARSHALL
AND WARD B. BROWNING, JR.
BY
Allen & Allen
ATTORNEYS.

Patented June 6, 1950

2,510,123

UNITED STATES PATENT OFFICE 2,510,123

CLADDING APPARATUS

Marcus W. Marshall and Ward B. Browning, Jr., Middletown, Ohio, assignors to Armco Steel Corporation, Middletown, Ohio, a corporation of Ohio Application November 10, 1948, Serial No. 59,384

12 Claims. (Cl. 219—8)

1

This invention relates to a cladding apparatus suitable for carrying out cladding by means of the self-consuming electrode process.

Generally speaking according to the self-consuming electrode process, a slab of iron or steel of desired composition is clad with a layer of surfacing metal or alloy such as stainless steel of suitable composition by covering the slab with a suitable insulating flux, laying strips, plates, bars, or sheet bars of cladding material on the slab, covering the whole with a flux such as a mixture of anhydrous lime, silica and anhydrous calcium fluoride or the like. A heavy electric current is then caused to pass between the cladding material and the slab, and strikes arcs between the cladding material and the slab, which arcs travel progressively along the length of the slab and cause the cladding material to be fused with and welded to the slab.

It is an object of our invention to provide an apparatus by means of which the self-consuming electrode process can be conveniently and expeditiously carried out. In view of the tremendously high amperage currents which are used in this process, a tremendous problem has been created in connection with current supply to the contactor bars, and a further object of our invention involves the provision of an arrangement of bus bars and cables which efficiently solve the aforesaid problem.

A further object of our invention involves the provision of novel means for bringing the contactor bars into contact with the cladding material.

A still further object of our invention resides in various improvements upon the cladding apparatus disclosed and claimed in a copending application in the name of Robert E. Kinkead, Serial No. 48,182 filed September 8, 1948.

These and other objects of our invention, which will be pointed out in more detail hereinafter, or which will be apparent to one skilled in the art upon reading these specifications, we accomplish by that certain construction and arrangement of parts of which we shall now describe certain exemplary embodiments.

Reference is made to the drawings forming a part hereof and in which:

Figure 1 is a side elevational view of an apparatus according to our invention with parts in cross-section.

2

Figure 3 is an end elevational view of the apparatus showing an exemplary control valve in cross-section.

Figure 4 is a fragmentary view of a series of control valves.

Figure 5 is a fragmentary view similar to Figure 3 but on an enlarged scale showing the contactor bars in raised position.

Figure 6 is a view similar to Figure 5 showing the contactor bars in their lowered position.

Figure 7 is a fragmentary cross-sectional view taken on the line 7—7 of Figure 6.

Figure 8 is a cross-sectional view taken on the line 8—8 of Figure 5.

Figure 9 is a greatly enlarged view of the top portion of Figure 6 showing a pressure equalizing linkage.

Figure 10 is a side elevational view of Figure 9.

Figure 11 is a cross-sectional view taken on the line 11—11 of Figure 9, and

Figure 12 is a view similar to Figure 9 of a modified linkage.

Briefly in the practice of our invention, we provide a framework having a longitudinal opening therethrough through which a slab to be treated may be brought into the apparatus and removed from the apparatus. It would be possible, of course, to have the ends fully closed and to insert and remove the slab laterally, but we believe that the embodiment shown, better lends itself to straight line production methods. Adjacent the top of the frame, we mount a longitudinal carrier which carries a row of cylinders which may be hydraulically or pneumatically operated. In the particular embodiment shown the cylinders are pneumatically operated. Each of the cylinders is provided with a piston and piston rod from which are suspended sets of contactor bars. These contactor bar sets may be individually raised or lowered by means of the respective pneumatic cylinders.

Figure 1:
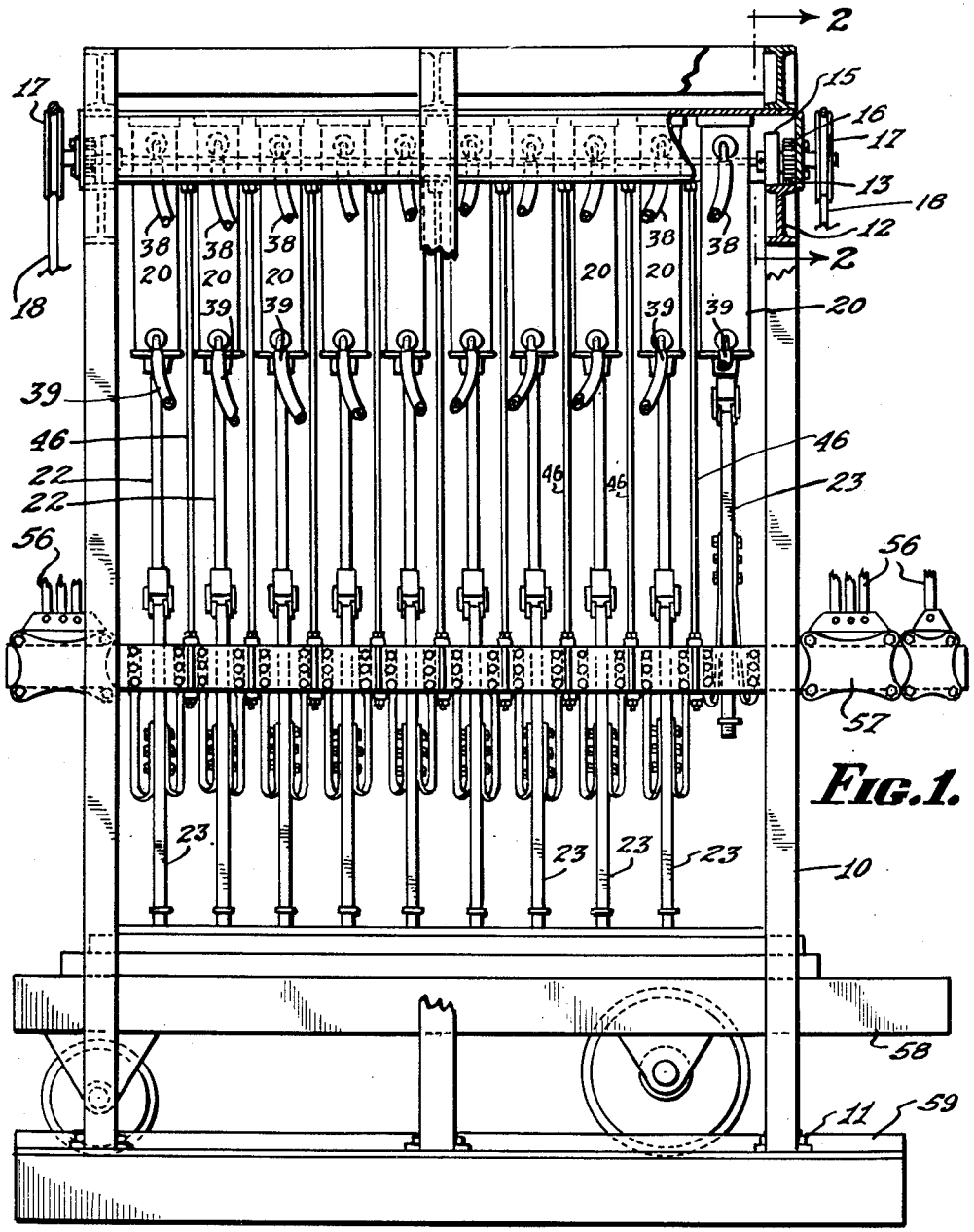
Figure 2:
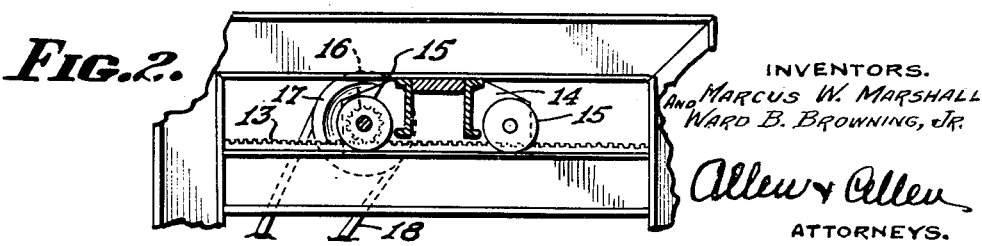
Figure 2 is a fragmentary cross-sectional view taken on the line 2—2 of Figure 1.

Referring more particularly to the drawings, we have shown a framework, indicated generally at 10, suitably secured to the floor, as by bolts 11. Adjacent the top we provide the transverse rails 12 which, as best seen in Figure 1, are provided with a rack 13. A carrier 14 provided with rollers 15 is arranged to ride on the rails 12 and pinions 16 are mounted coaxially with at least one of the rollers 15 in position to engage the rack 13. Preferably we provide a rack 13 at each end of the machine and a pinion 16 at each end.

Coaxially with the pinion 16 we provide a pulley 17, preferably at each end of the machine, over which passes a belt or chain 18. The belt or chain may pass over a pulley conveniently located for an operator and provided with a crank or the like, so that by actuation of the belts 18, the carriage 14 can be caused to move transversely of the apparatus along the tracks or rails 12.

The carrier 14 carries secured thereto by any desired means a plurality of cylinders 20. Each of the cylinders 20 is provided with a piston 21 to which is attached a piston rod 22.

At the lower end of each piston rod 22, we provide a pressure equalizing linkage for the suspension of the contactor bars 23. Referring more particularly to Figures 9 to 11 inclusive, each two of the three contactor bars are connected together on both sides by means of links. Thus in Figure 11 the bar 23a is connected to the bar 23b by links 24, while the contactor bar 23b is connected to the contactor bar 23c by the links 25. These links at their inner ends are suitably rabbeted, as indicated by the broken lines at 26, so that the links on each side of the contactor bars are substantially coplanar.

Each of the links 24 has pivoted to it, as at 27, a link 28 and each of the links 25 has pivoted to it, as at 29, a link 30. The upper ends of the links 28 and 30 are suitably rabbeted as at 31, so that the links 28 and 30 on each side are substantially coplanar.

The links 28 and 30 are pivoted together as at 32 to an enlarged member 33 secured to the end of the piston rod 22.

It will be noted that the pivot points 27 and 29 are displaced from the center between the respective contactor bars 23a and 23b, and 23b and 23c. These points are displaced toward the outside so that they are about two-thirds of the distance between the suspension points of the outer contactor bars 23a and 23c from the suspension point of the center contactor bar 23b. It will be understood, of course, that the links 24, 25, 28 and 30 are of insulating material, such as for example, Micarta, to insulate the contactor bars with their high current from each other, from the air cylinders and the rest of the unit.

The linkage arrangement just described has for its purpose to insure substantially equal pressure on the three contactor bars when the piston 21 is caused to move downwardly to press the contactor bars against the cladding material on the slab. There will always be certain irregularities in the material and it is desirable to have equally good contact for each of the contactor bars.

The arrangement of Figure 12 is similar to that of Figures 9 to 10 inclusive except that triangular plates are used instead of links. Thus the contactor bars 23a and 23b are connected on both sides by triangular plates 24a, and the contactor bars 23b and 23c are connected by the triangular plates 25a. A third triangular plate on each side indicated at 28a, is connected to the upper corners of each of the plates 24a and 25a, as indicated at 27a and 29a, and the upper corners of the plates 28a are connected as at 32a, to a member 33a secured to the piston rod 22. The arrangement of Figure 12 functions in the same manner as that of Figures 9 to 11 inclusive except that the pivot holes, or at least one of the pivot holes, must be enlarged in order for the linkage to function. If all the pivot holes were snug fits, the device would be completely locked against relative movement of the various parts. However, with a slight amount of enlargement of at least the holes indicated at 34, the device will function although it may be desirable to enlarge slightly the holes at 27a and 29a as well.

The equalizing linkages described above form the subject matter of a copending application in the name of James C. Young, Serial No. 59,401, filed November 10, 1948, wherein said linkages are specifically claimed.

It will, of course, be understood that other forms of pressure equalizers could be used to accomplish the required results. These could be mechanical, hydraulic, pneumatic or the like.

With the arrangement shown when the contactor bars are in the position of Figure 5 they simply hang from the piston rod 22, whereas in the position of Figure 6, the piston rod 22 is exerting substantially equal pressure on each of the contactor bars in the particular set.

The contactor bars are maintained in spaced relation to the top by the links 24 and 25 and in order to provide for proper spacing thereof at the bottom, we provide a spacing element 35 which may be made of insulating material such as Micarta and which has apertures 36 to permit passage of the contactor bars 23. Preferably the center contactor bar will be provided with a lug 37 to keep the member 35 from falling off the assembly.

From the foregoing description, it will be clear that the contactor bars simply hang from the piston rods of the respective pistons and are not in any way guided. They maintain their spaced relation by means of the links 24 and 25 and the spacing element 35 and maintain a vertical position by virtue of their weight alone.

Each of the cylinders is provided with conduits for air, as at 38 and 39, and these conduits are connected to valves 40, there being one valve for each cylinder. All the valves 40 are connected to a header 41 which leads to a suitable source of compressed air. The valves may be of any desired form and do not represent a part of our invention per se. They are provided with handle members 42 by means of which compressed air may be caused to flow either through the conduit 38 to move the contactor bars down or through the conduits 39 to raise the contactor bars up, there being of course vent apertures 43. It will be clear that a suitable bar engaging all the handles 42 may be provided whereby all the pistons may be raised simultaneously or lowered simultaneously and yet each of them can be raised individually during the cladding process as required.

In the particular apparatus disclosed herein, we provide six bus bars, there being two for the outer contactor bars on each side and two for the center contactor bars. As best seen in Figure 3, all of the bus bars are secured between insulating members 44 and 45 through which pass the suspension rods 46. The rods 46 are secured at their ends to the carriage 14 and they hold the lower bars 45 by means of nuts 47 threaded onto their lower ends, and the upper members 44 are held against the bus bars by means of the nuts 48, as seen most clearly in Figures 1, 5 and 6. The bus bars themselves are indicated at 49, 49a, 50, 50a, 51 and 51a. Supplementary bolts 52 are provided on the inside of the outer bus bars to clamp the members 44 and 45 together to hold all the bus bars securely in place.

Copper braided shunts or cables 53 having contacting lugs at their ends serve to connect the bus bars 49 and 49a to the contactor bars 23a, there being two or more cables 53 for each of the contactor bars 23a, depending upon the amount of current to be carried. The lugs of the cables 53 are bolted to the contactor bars 23a on opposed sides thereof longitudinally of the apparatus, as indicated at 54 and their other ends are secured between the bus bars 49 and 49a by means of bolts 55. The arrangement just described is repeated in connection with the contactor bars 23c and the bus bars 51 and 51a.

For the center contactor bars 23b, the respective bus bars 50 and 50a are separated with the bus bar 50 passing between the row of contactor bars 23a and the row of contactor bars 23b. The bus bar 50a passes between the row of contactor bars 23b and the row of contactor bars 23c. Each of the center contactor bars 23b has secured to opposed faces thereof longitudinally of the apparatus, as indicated at 54b, the braided cables 53b, and the cables 53b are secured alternately to the bus bar 50 and the bus bar 50a, as best seen in Figure 7. The arrangement described above solves the problem of bringing heavy amperage current to the individual contactor bars without having an excess of cables which are apt to swing and thus produce short circuits. The cables 53 and 53b are preferably covered with an insulation material such as asbestos or glass wool sleeving or other suitable material.

Barriers of formica sheeting diagrammatically shown at 53c or other suitable insulating material, suitably cut to permit movement of the braided cables, are also placed between the contactor bars and attached to the bus bars to further prevent short circuiting between the contactor bars or cables.

Current is supplied to the various bus bars by suitable leads 56 attached to clamps 57 which are clamped on the bus bars, as shown in Figure 1.

In practice the slab 60 to be treated is covered with a flux insulation layer, as indicated at 61, and the cladding material 62 in strips or bars is placed on the slab. The contactor bars are then brought down to the position of Figure 6. Steel filings or millings are piled across the front end of each electrode to cause arcs to strike between the electrodes and the base slab when the voltage is turned on. The entire slab and cladding material are then covered with additional flux, are shown in Figure 6, which is preferably kept from spilling off the supporting car by means of dams 63, and the process is started. As the arcs travel along and the cladding operation proceeds, succeeding sets of contactor bars are raised as the arcs approach within a few inches of them, by actuating the appropriate valve 40. This method of contacting prevents overheating of the cladding material and premature melting of the insulating flux by making it unnecessary for the heavy current to pass through more than a short length of cladding material to reach the arcs.

If the slab is wider than the capacity of the apparatus for a single pass, the operation is repeated with the carriage 14 moved over, as described hereinabove.

The connections 56 briefly mentioned above are understood to be such that the bus bars 49 and 49a are connected to one phase, the bus bars 50 and 50a to a second phase and the bus bars 51 and 51a to a third phase of a three-phase current supply, and the slabs being clad will usually be grounded.

It will be clear that larger numbers of contactor bars could be used, and that if a three-phase current is used, the contactor bars will preferably be provided in multiples of three so that they can be equally loaded onto a three-phase circuit. Of course, if any other polyphase current is used, the number of contactor bars per set will probably be a multiple of the number of phases. The same apparatus may also be used with single phase or direct current with any desired number of contactor bars. It will also be clear that we have shown the bus bars 49, 49a and 51, 51a as being double, while they could, of course, be unitary bars of double capacity. The bus bars 50 and 50a, however, are preferably double as shown on account of space limitations.

While we have shown a movable carriage for the contactor bars for cladding wider slabs, it will be clear that the carriage could be fixed, and one or more duplicates could be provided for cladding slabs of any desired width. The capacity of the apparatus can also be increased by using larger contactor bars and electrodes and a heavier current.

It will be clear that numerous modifications may be made in our invention without departing from the spirit thereof, and we therefore do not intend to limit ourselves except as pointed out in the claims which follow.

Having now fully described our invention, what we claim as new and desire to secure by Letters Patent is:

1. An apparatus for the purpose described, comprising a frame having an opening through which a slab to be treated may be inserted, a carrier mounted longitudinally adjacent the top of said frame, a plurality of vertical cylinders mounted in line along the length of said carrier, said cylinders being provided with pistons having rods and being connected to a suitable source of fluid under pressure, said connections including valve means for selectively actuating any of said pistons, said apparatus having, for each piston, a set of three contactor bars arranged side-by-side in spaced relation transversely of said apparatus, insulating means for maintaining said spaced relation, means for suspending a set of three bars from each of said piston rods, including pressure equalizing means to insure substantially equal pressure on a work piece by each of said bars when they are pressed into contact with said work piece, and means for leading a high amperage electric current to each of said bars.

2. An apparatus according to claim 1, in which said electric current is a three-phase current, and in which one bar of each set is connected to one phase, a second bar of each set is connected to a second phase, and a third bar of each set is connected to a third phase of said current.

3. An apparatus according to claim 2, in which said leading means comprise a bus bar longitudinally disposed at one side of said sets of contactor bars, a second bus bar longitudinally disposed at the other side of said sets of bars, and a third bus bar comprising two half capacity sections, one of said half capacity sections being longitudinally disposed between the row of center bars and the row of bars on one side, and the other of said half capacity sections being longitudinally disposed between the row of center bars and the row of bars on the other side, said bus bars being connected to said source of three-phase current, and the respective bus bars being connected respectively to the individual bars in the respective rows.

4. An apparatus according to claim 3, in which the connections between the bus bars and the contactor bars comprise braided wire cables, and in which each bar is connected to its respective bus bar by a cable.

5. An apparatus according to claim 4, in which each contactor bar in the two outer rows is connected by cables attached to opposed sides thereof longitudinally of said apparatus, and attached to the respective outer bus bars, and each contactor bar in the center row is connected by two cables attached to opposed sides thereof longitudinally of said apparatus, and attached alternately to one and the other of said half capacity bus bars.

6. An apparatus for the purpose described, comprising a frame having an opening through which a slab to be treated may be inserted, a carrier mounted longitudinally adjacent the top of said frame, a plurality of transverse sets of contactor bars suspended from said carrier in a longitudinal line, means for raising and lowering said sets of contactor bars selectively, a plurality of bus bars for supplying current to said contactor bars disposed longitudinally of said apparatus, and means for suspending said bus bars from said carrier intermediate the vertical extent of said contactor bars.

7. An apparatus according to claim 6, in which said bus bars are clamped between pairs of transverse insulating bars, and said insulating bars are secured to said carrier.

8. An apparatus according to claim 7, in which said bus bars are connected to said contactor bars by flexible conductors, said conductors being secured to said contactor bars at points which are opposite said bus bars substantially midway between the uppermost and lowermost positions of said contactor bars.

9. An apparatus according to claim 8, in which there are at least three contactor bars per set, and in which there are at least three bus bars, said bus bars being connected respectively to different phases of a three-phase source of electric current, and each contactor bar of a set being connected to a different one of said bus bars.

10. An apparatus for the purpose described, comprising a frame having an opening through which a slab to be treated may be inserted, transverse rails secured to said frame adjacent the top, a longitudinal carrier having wheels arranged to ride on said rails, a plurality of transverse sets of contactor bars suspended from said carrier in a longitudinal line, means for raising and lowering said sets of contactor bars selectively, a plurality of bus bars for supplying current to said contactor bars disposed longitudinally of said apparatus, means for suspending said bus bars from said carrier intermediate the vertical extent of said contactor bars, and means for moving said carrier along said rails.

11. An apparatus according to claim 10, in which said last mentioned means comprises a rack associated with at least one of said rails, a pinion meshing with said rack and journaled on said carrier, and remote means for rotating said pinion.

12. An apparatus for the purpose described, comprising a frame having an opening through which a slab to be treated may be inserted, transverse rails in the upper part of said frame, a carriage of a length substantially equal to the length of said frame arranged for movement transversely thereof on said rails, a plurality of cylinders mounted in line along the length of said carriage, said cylinders being provided with pistons having rods, and being connected to a suitable source of fluid under pressure, valve means for selectively causing any of said pistons to move up or down in said cylinders, said apparatus having for each cylinder a set of three contactor bars arranged side-by-side transversely of said apparatus, said contactor bars being suspended from said piston rods in substantial parallelism, means for spacing said contactor bars apart at the tops and bottoms, means for insuring substantially equal pressure on each of said contactor bars when they are pressed into contact with a work piece, and means for leading a high amperage electrical current to each of said contactor bars, said contactor bars being insulated from each other.

MARCUS W. MARSHALL.
WARD B. BROWNING, Jr.

No references cited.